(12) United States Patent
Van Nieuwkoop

(10) Patent No.: US 8,430,177 B2
(45) Date of Patent: Apr. 30, 2013

(54) METHOD OF EXPANDING A TUBULAR ELEMENT IN A WELLBORE

(75) Inventor: Pieter Van Nieuwkoop, Rijswijk (NL)

(73) Assignee: Shell Oil Company, Houston, TX (US)

( * ) Notice: Subject to any disclaimer, the term of this patent is extended or adjusted under 35 U.S.C. 154(b) by 291 days.

(21) Appl. No.: 12/811,555

(22) PCT Filed: Dec. 24, 2008

(86) PCT No.: PCT/EP2008/068296
§ 371 (c)(1),
(2), (4) Date: Jul. 2, 2010

(87) PCT Pub. No.: WO2009/087068
PCT Pub. Date: Jul. 16, 2009

(65) Prior Publication Data
US 2010/0294513 A1    Nov. 25, 2010

(30) Foreign Application Priority Data

Jan. 4, 2008 (EP) .................................. 08100118

(51) Int. Cl.
*E21B 19/00* (2006.01)
(52) U.S. Cl.
USPC ........................................ 166/384; 405/150.1
(58) Field of Classification Search .................. 166/384, 166/242.2, 207; 405/150.1, 184, 165, 146; 175/171, 78, 52
See application file for complete search history.

(56) References Cited

U.S. PATENT DOCUMENTS

| 4,135,958 A | 1/1979 | Wood | 156/199 |
| 6,446,670 B1 * | 9/2002 | Woodward et al. | 138/98 |
| 7,387,174 B2 * | 6/2008 | Lurie | 175/57 |

FOREIGN PATENT DOCUMENTS

| EP | 0044706 | 1/1982 |
| EP | 0611914 | 8/1994 |
| EP | 0919762 | 6/1999 |
| WO | WO9947340 | 9/1999 |
| WO | WO03036025 | 5/2003 |
| WO | WO2004020893 | 3/2004 |
| WO | WO2005024178 | 3/2005 |

* cited by examiner

*Primary Examiner* — Shane Bomar
*Assistant Examiner* — Kipp Wallace

(57) ABSTRACT

A method of radially expanding a tubular element in a wellbore formed in an earth formation comprises arranging the tubular element in the wellbore such that a lower end portion of the wall of the tubular element extends radially outward and in an axially reverse direction so as to form an expanded tubular section extending around a remaining tubular section of the tubular element, whereby an annulus is defined between the expanded and remaining tubular sections. The expanded tubular section is axially extended by moving the remaining tubular section downward relative to the expanded tubular section so that the lower end portion of the wall bends radially outward and in an axially reverse direction, and load transfer means is positioned in the annulus, the load transfer means being arranged to transfer a load between the remaining tubular section and the expanded tubular section.

18 Claims, 4 Drawing Sheets

METHOD OF EXPANDING A TUBULAR ELEMENT IN A WELLBORE

PRIORITY CLAIM

The present application claims priority to PCT Application EP2008/066296, filed 24 Dec. 2008, which in turn claims priority from European Application EP08100118.2, filed 4 Jan. 2008.

TECHNICAL FIELD OF THE INVENTION

The present invention relates to a method of radially expanding a tubular element in a wellbore formed into an earth formation.

BACKGROUND OF THE INVENTION

The technology of radially expanding tubular elements in wellbores finds increasing application in the industry of oil and gas production from subterranean formations. Wellbores are generally provided with one or more casings or liners to provide stability to the wellbore wall, and/or to provide zonal isolation between different earth formation layers. The terms "casing" and "liner" refer to tubular elements for supporting and stabilising the wellbore wall, whereby it is generally understood that casing extends from surface into the wellbore and that a liner extends from a certain depth further into the wellbore. However, in the context of this disclosure the terms "casing" and "liner" are used interchangeably and without such intended distinction.

In conventional wellbore construction, several casings are installed at different depth intervals, in a nested arrangement, whereby each subsequent casing is lowered through the previous casing and therefore has a smaller diameter than the previous casing. As a result, the cross-sectional wellbore size that is available for oil and gas production, decreases with depth. To alleviate this drawback, it has become general practice to radially expand one or more tubular elements at the desired depth in the wellbore, for example to form an expanded casing, expanded liner, or a clad against an existing casing or liner. Also, it has been proposed to radially expand each subsequent casing to substantially the same diameter as the previous casing to form a monobore wellbore. It is thus achieved that the available diameter of the wellbore remains substantially constant along (a portion of) its depth as opposed to the conventional nested arrangement.

EP 1438483 B1 discloses a system for expanding a tubular element in a wellbore whereby the tubular element, in unexpanded state, is initially attached to a drill string during drilling of a new wellbore section.

To expand such wellbore tubular element, generally a conical expander is used with a largest outer diameter substantially equal to the required tubular diameter after expansion. The expander is pumped, pushed or pulled through the tubular element. Such method can lead to high friction forces between the expander and the tubular element. Also, there is a risk that the expander becomes stuck in the tubular element.

EP 0044706 A2 discloses a flexible tube of woven material or cloth that is expanded in a wellbore by eversion to separate drilling fluid pumped into the wellbore from slurry cuttings flowing towards the surface.

However there is a need for an improved method of radially expanding a tubular element in a wellbore.

SUMMARY OF THE INVENTION

In accordance with the invention there is provided a method of radially expanding a tubular element in a wellbore formed in an earth formation, the method comprising:

a) arranging the tubular element in the wellbore whereby a lower end portion of the wall of the tubular element extends radially outward and in axially reverse direction so as to form an expanded tubular section extending around a remaining tubular section of the tubular element, whereby an annulus is defined between said expanded and remaining tubular sections;

b) axially extending the expanded tubular section by moving the remaining tubular section downward relative to the expanded tubular section so that said lower end portion of the wall bends radially outward and in axially reverse direction; and c) positioning load transfer means in the annulus, the load transfer means being arranged to transfer a load between the remaining tubular section and the expanded tubular section.

By moving the remaining tubular section downward relative to the expanded tubular section, the tubular element is effectively turned inside out whereby the tubular element is progressively expanded without the need for an expander that is pushed, pulled or pumped through the tubular element. The expanded tubular section can form a casing or liner in the wellbore.

Further, the load transfer means interconnects the remaining tubular section and the expanded tubular section so as to form a strong assembly capable of supporting the wellbore wall and withstanding external loads, such as compressive loads from the surrounding earth formation, formation fluid pressures, and wellbore fluid pressures.

Suitably step c) comprises inserting a stream of fluidic material susceptible of hardening into the annulus, and allowing the fluidic material to harden in the annulus. A particularly strong assembly is obtained if the fluidic material expands upon hardening.

Alternatively, step c) comprises arranging a body of swellable material in the annulus, the swellable material being susceptible of swelling upon contact with a selected fluid, and inserting the selected fluid into the annulus so as to contact the swellable material. Suitable swellable materials include, for example, swellable elastomers. The body of swellable material can be applied in the form of a layer to the outer surface of the remaining tubular section and/or to the inner surface of the expanded tubular section. Alternatively the swellable material can be supplied in the form of particles that are pumped into the annulus. The selected fluid is, for example, oil or water.

To achieve enhanced sealing of the expanded tubular section to the wellbore wall, preferably the load transfer means exerts a radially outward pressure to the expanded tubular section.

In an alternative arrangement, the load transfer means includes a plurality of solid elongate members extending in axial direction into the annulus, regularly spaced in circumferential direction of the annulus.

In order to achieve that the expanded tubular section retains its expanded form, it is preferred that the wall of the tubular element includes a material that is plastically deformed in the bending zone, so that the expanded tubular section automatically remains expanded as a result of said plastic deformation. Plastic deformation refers in this respect to permanent deformation, as occurring during deformation of various ductile metals upon exceeding the yield strength of the material. Thus, there is no need for an external force or pressure to maintain the expanded form. If, for example, the expanded tubular section has been expanded against the wellbore wall as a result of said bending of the wall, no external radial force or pressure needs to be exerted to the expanded tubular section to keep it against the wellbore wall. Suitably the wall of the tubular element is made of a metal such as steel or any other ductile metal capable of being plastically deformed by eversion of the tubular element. The expanded tubular section then has adequate collapse resistance, for example in the order of 100-150 bars.

In order to induce said movement of the remaining tubular section, preferably the remaining tubular section is subjected to an axially compressive force acting to induce said movement. The axially compressive force preferably at least partly results from the weight of the remaining tubular section. If necessary the weight can be supplemented by an external, downward, force applied to the remaining tubular section to induce said movement. As the length, and hence the weight, of the remaining tubular section increases, an upward force may need to be applied to the remaining tubular section to prevent uncontrolled bending or buckling in the bending zone.

BRIEF DESCRIPTION OF THE DRAWINGS

The invention will be described hereinafter in more detail and by way of example, with reference to the accompanying drawings in which.

In the drawings and the description, like reference numerals relate to like components.

DETAILED DESCRIPTION OF THE PREFERRED EMBODIMENTS

Figure 1:
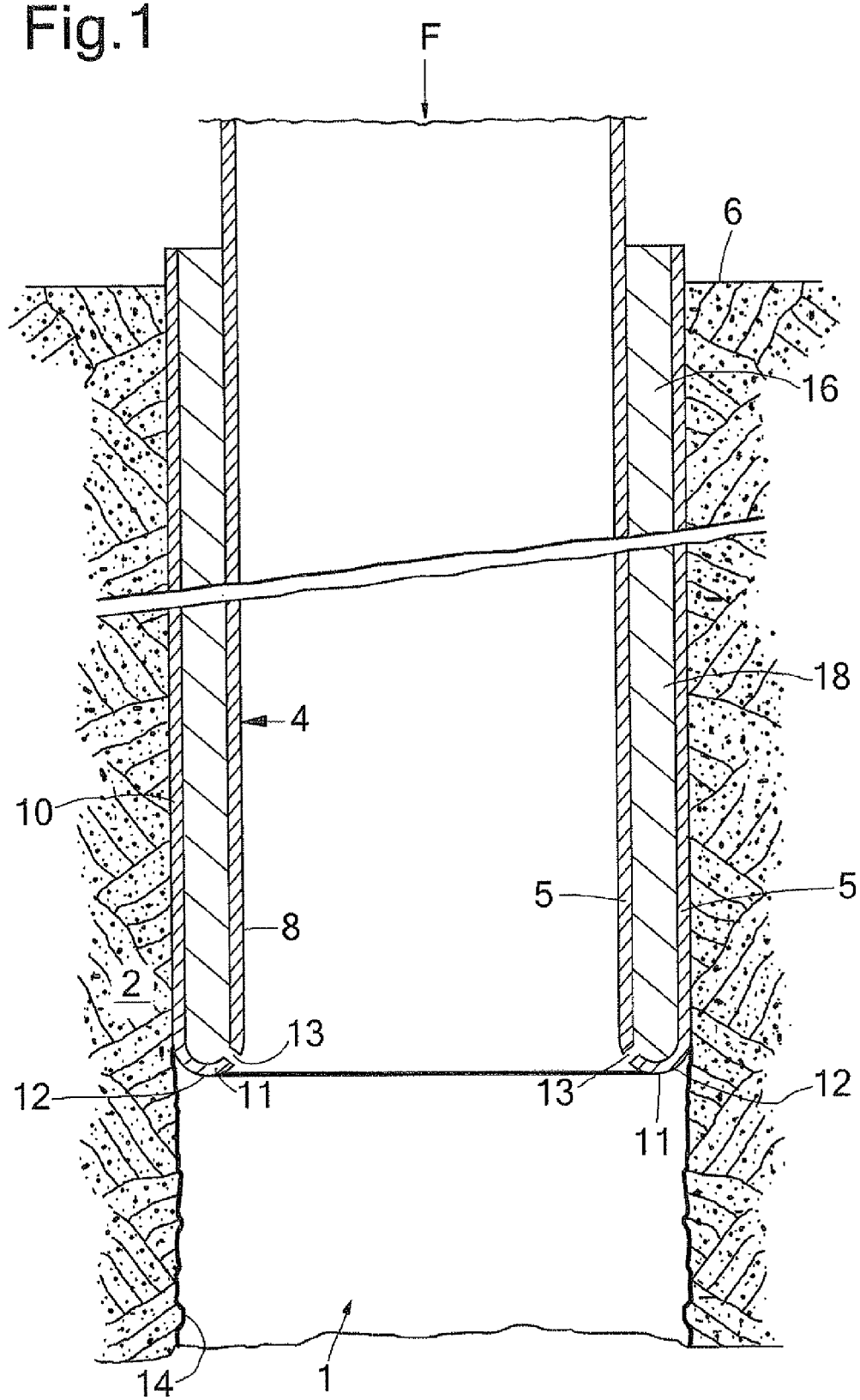
FIG. 1 schematically shows a first embodiment of a wellbore system used with the method of the invention.

Referring to FIG. 1 there is shown a wellbore system whereby a wellbore 1 extends into an earth formation 2, and a tubular element in the form of liner 4 extends from surface 6 downwardly into the wellbore 1. The liner 4 has been partially radially expanded by eversion of its wall 5 whereby a radially expanded tubular section 10 of the liner 4 has been formed of outer diameter substantially equal to the wellbore diameter. A remaining tubular section of the liner 4, in the form of unexpanded liner section 8, extends from surface 6 concentrically into the expanded tubular section 10.

The wall 5 of the liner 4 is, due to eversion at its lower end, bent radially outward and in axially reverse (i.e. upward) direction so as to form a U-shaped lower section 11 of the wall 5 interconnecting the unexpanded liner section 8 and the expanded liner section 10. The U-shaped lower section 11 of the liner 4 defines a bending zone 12 of the liner. The expanded tubular section 10 and the remaining tubular section 8 define an annulus 16 there between, containing load transfer means arranged to transfer a load between the unexpanded liner section 8 and the expanded liner section 10. The load transfer means is formed by a body of cement 18 that expands upon hardening. However any other suitable fluidic material that hardens in the annulus can be used instead of cement. Furthermore, the wall 5 is at its lower end provided with a series of openings 13 which provide fluid communication between the annulus 16 and the interior of the unexpanded liner section 8.

The expanded liner section 10 is axially fixed to the wellbore wall 14 by virtue of frictional forces between the expanded liner section 10 and the wellbore wall 14 resulting from the expansion process. Alternatively, or additionally, the expanded liner section 10 can be anchored to the wellbore wall by any suitable anchoring means (not shown).

Figure 2:
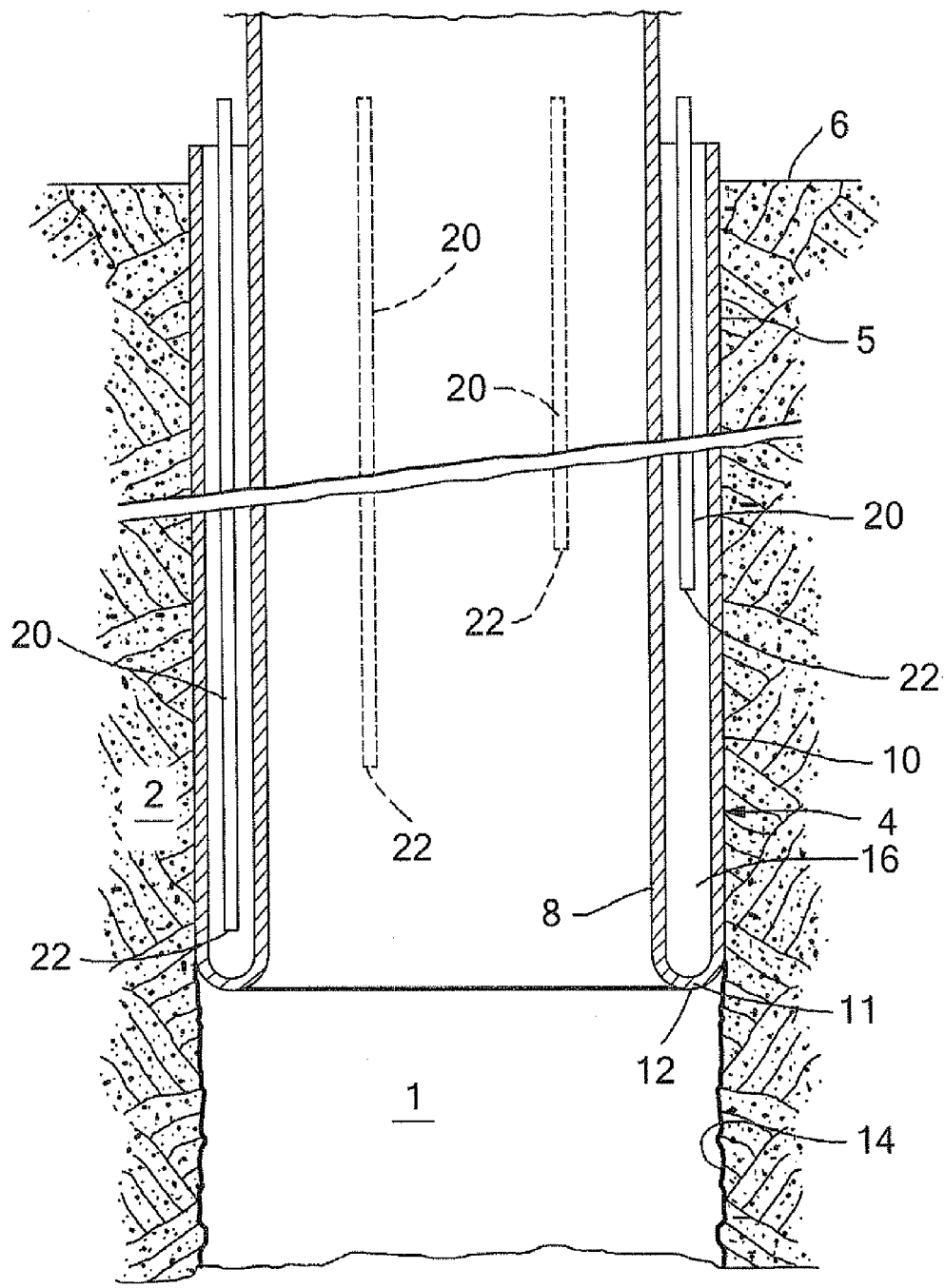
FIG. 2 schematically shows a second embodiment of a wellbore system used with the method of the invention, before inserting cement into an annulus between unexpanded and expanded liner sections.

Referring to FIG. 2 there is shown the second embodiment, which is substantially similar to the first embodiment except that the openings 13 are not present in the wall 5, and that in addition a series of tubes 20 extend from surface 6 into the annulus 16. The tubes 20 are regularly spaced along the circumference of the annulus 16, and have respective lower end openings 22 positioned at different depth levels in the annulus 16.

Figure 3:
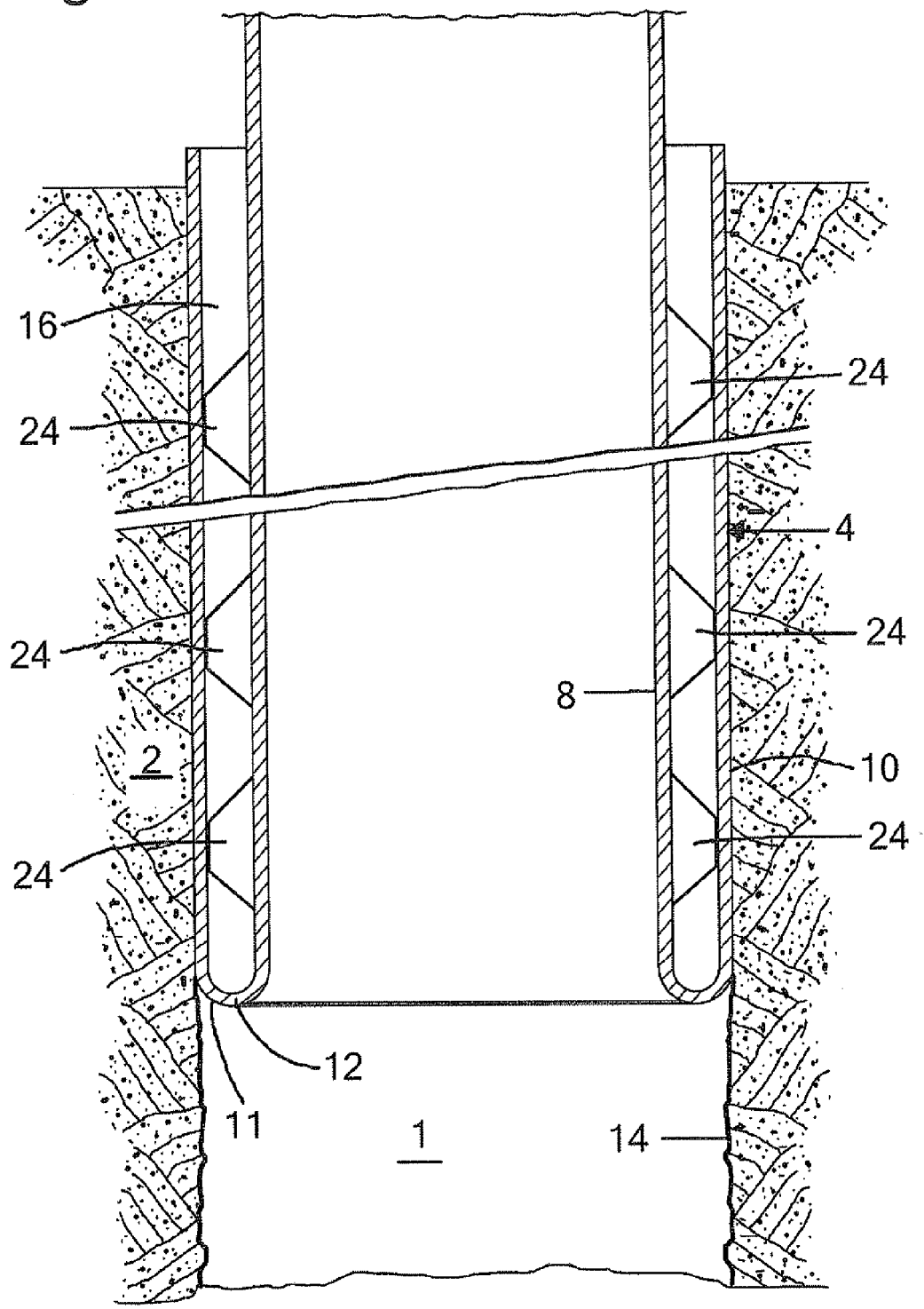
FIG. 3 schematically shows a third embodiment of a wellbore system used with the method of the invention.

Referring to FIG. 3 there is shown the third embodiment, which is substantially similar to the first embodiment except that the load transfer means is formed by a plurality of annular support members 24 fixedly connected to the unexpanded liner section 8 and extending against the expanded liner section 10.

Figure 4:
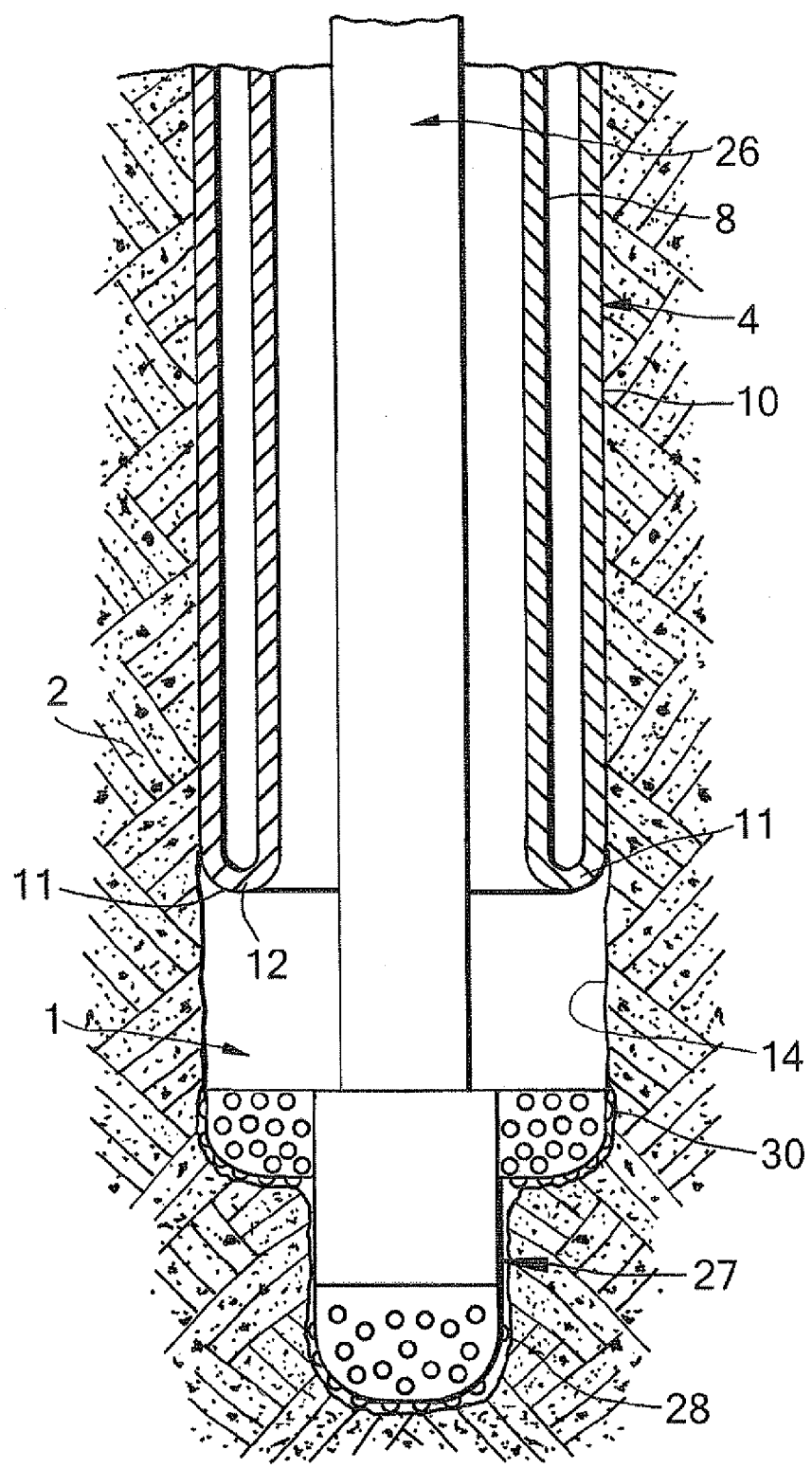
FIG. 4 schematically shows the first embodiment modified in that a drill string for drilling the wellbore extends through the expanded liner section.

Referring to FIG. 4 there is shown the first embodiment during drilling of the wellbore 1 whereby a drill string 26 extends from surface 6 through the unexpanded liner section 8 to the bottom of the wellbore 1. The drill string 26 is at its lower end provided with a drill bit 27 comprising a pilot bit 28 with gauge diameter slightly smaller than the internal diameter of the unexpanded liner section 8, and a reamer section 30 with gauge diameter adapted to drill the wellbore 1 to its nominal diameter. The reamer section 30 is radially retractable to an outer diameter allowing it to pass through unexpanded liner section 8, so that the drill string 26 can be retrieved through the unexpanded liner section 8 to surface.

During normal operation of the first embodiment (FIG. 1), a lower end portion of the liner 4 is initially everted. That is, the lower portion is bent radially outward and in axially reverse direction. The U-shaped lower section 11 and the expanded liner section 10 are thereby initiated. Subsequently, the short length of expanded liner section 10 that has been formed is anchored to the wellbore wall 14 by any suitable anchoring means. Depending on the geometry and/or material properties of the liner 4, the expanded liner section 10 alternatively can become anchored to the wellbore wall automatically due to friction between the expanded liner section 10 and the wellbore wall 14.

The unexpanded liner section 8 is then gradually moved downward by application of a sufficiently large downward force F thereto, whereby the unexpanded liner section 8 becomes progressively everted in the bending zone 12. In this manner the unexpanded liner section 8 is progressively transformed into the expanded liner section 10. The bending zone 12 moves in downward direction during the eversion process, at approximately half the speed of the unexpanded liner section 8.

Since the length, and hence the weight, of the unexpanded liner section 8 gradually increases, the magnitude of the downward force F can be gradually lowered in correspondence with the increasing weight of liner section 8. As the weight increases, the downward force eventually may need to be replaced by an upward force to prevent buckling of liner section 8.

When a sufficient length of expanded liner section 10 has been formed in the manner described above, a stream of cement is pumped from surface into the annulus 16. The stream is circulated through the openings 13 so that any other fluid present in the annulus 16 is circulated out of the annulus 16 by the pumping action. Thereafter the cement hardens in the annulus to form the body of hardened cement 18 whereby the cement slightly expands. The body of cement 18 interconnects the unexpanded and expanded liner sections 8, 10 thereby forming a strong composite capable of transferring loads between the unexpanded and expanded liner sections 8, 10. Such loads include, for example, radial loads from the surrounding earth formation 2, wellbore fluid pressure, formation fluid pressure, or the weight of the unexpanded liner section 8. Also, by virtue of expansion of the cement, the body of hardened cement 18 pushes the expanded liner section 10 slightly further radially outward and thereby enhances sealing of the expanded liner section 10 to the wellbore wall 14.

Normal operation of the second embodiment (FIG. 2) is substantially similar to normal operation of the first embodiment, except regarding the following. The stream of cement is pumped from surface into the annulus 16. Instead of circulating the stream through openings in the wall of the liner (as in the first embodiment), the stream is circulated through the tubes 20 whereby the circulated fluid enters the tubes 20 at their respective lower end openings 22. Any other fluid that may be present in the annulus 16 is circulated out of the annulus 16 by the pumping action.

Normal operation of the third embodiment (FIG. 3) is substantially similar to normal operation of the first embodiment, except regarding the following. The annular support members 24 are connected to the final unexpanded liner section 8, i.e. the section of unexpanded liner that remains unexpanded, before lowering thereof into the wellbore 1. After the final unexpanded liner section 8 has been lowered, the annular support members 24 extend against the inner surface of the expanded liner section 10. Thus, the annular support members 24 transfer radial loads between the final unexpanded liner section 8 and the expanded liner section 10.

Normal operation of the modified first embodiment (FIG. 4) is substantially similar to normal operation of the first embodiment, except with regard to the following. Simultaneously with downward movement of the unexpanded liner section 8 into the wellbore, the drill string 26 is operated to rotate the drill bit 27 whereby the pilot bit 28 drills an initial portion of the borehole and the reamer section 30 enlarges the borehole to the final gauge diameter. The drill string 26 thereby gradually moves downward into the wellbore 1. The unexpanded liner section 8 is moved downward in a controlled manner and at substantially the same speed as the drill string 26, so that it is ensured that the bending zone 12 remains at a short distance above the drill bit 27. Controlled lowering of the unexpanded liner section 8 can be achieved, for example, by controlling the downward force, or upward force, referred to hereinbefore. Suitably, the unexpanded liner section 8 is supported by the drill string 26, for example by bearing means (not shown) connected to the drill string, which supports the U-shaped lower section 11. In that case the upward force is suitably applied to the drill string 26 and transmitted via the bearing means to the unexpanded liner section 8. Furthermore, at least a portion of the weight of the unexpanded liner section 8 can be transferred to the drill string 26 by the bearing means, so as to provide a thrust force to the drill bit 27.

When it is required to retrieve the drill string 26 to surface, for example when the drill bit 27 is to be replaced or when drilling of the wellbore 1 is complete, the reamer section 30 brought to its radially retracted mode. Subsequently the drill string 26 is retrieved through the unexpanded liner section 8 to surface.

With the wellbore system of the invention, it is achieved that the wellbore is progressively lined with the everted liner directly above the drill bit during the drilling process. As a result, there is only a relatively short open-hole section of the wellbore during the drilling process at all times. The advantages of such short open-hole section will be most pronounced during drilling into a hydrocarbon fluid containing layer of the earth formation. In view thereof, for many applications it will be sufficient if the process of liner eversion during drilling is applied only during drilling into the hydrocarbon fluid reservoir, while other sections of the wellbore are lined or cased in conventional manner. Alternatively, the process of liner eversion during drilling may be commenced at surface or at a selected downhole location, depending on circumstances.

In view of the short open-hole section during drilling, there is a significantly reduced risk that the wellbore fluid pressure gradient exceeds the fracture gradient of the rock formation, or that the wellbore fluid pressure gradient drops below the pore pressure gradient of the rock formation. Therefore, considerably longer intervals can be drilled at a single nominal diameter than in a conventional drilling practice whereby casings of stepwise decreasing diameter must be set at selected intervals.

Also, if the wellbore is drilled through a shale layer, such short open-hole section eliminates possible problems due to a heaving tendency of the shale.

In the above examples, expansion of the liner is started at surface or at a downhole location. In case of an offshore wellbore whereby an offshore platform is positioned above the wellbore, at the water surface, it can be advantageous to start the expansion process at the offshore platform. In such process, the bending zone moves from the offshore platform to the seabed and from there further into the wellbore. Thus, the resulting expanded tubular element not only forms a liner in the wellbore, but also a riser extending from the offshore platform to the seabed. The need for a separate riser is thereby obviated.

Furthermore, conduits such as electric wires or optical fibres for communication with downhole equipment can be extended in the annulus between the expanded and unexpanded sections. Such conduits can be attached to the outer surface of the tubular element before expansion thereof. Also, the expanded and unexpanded liner sections can be used as electricity conductors to transfer data and/or power downhole.

Since any length of unexpanded liner section that is still present in the wellbore after completion of the eversion process, will be subjected to less stringent loading conditions than the expanded liner section, such length of unexpanded liner section may have a smaller wall thickness, or may be of lower quality or steel grade, than the expanded liner section. For example, it may be made of pipe having a relatively low yield strength or relatively low collapse rating.

In order to reduce friction forces between the unexpanded and expanded liner sections during the expansion process, suitably a friction-reducing layer, such as a Teflon layer, is applied between the tube and the unexpanded and expanded liner sections. For example, a friction reducing coating can be applied to the outer surface of the liner before expansion, or to the inner and/or outer surface of the tube.

In a modified version of the third embodiment, the annular support members are arranged to move, together with the liner wall, through the bending zone. Thus, after eversion the annular support members are fixedly connected to the expanded liner section and extend against the unexpanded liner section.

Instead of expanding the expanded liner section against the wellbore wall (as explained in the detailed description), the expanded liner section can be expanded against the inner surface of another tubular element already present in the wellbore.

The invention claimed is:

1. A method of radially expanding a tubular element in a wellbore formed in an earth formation, the method comprising:
   a) arranging the tubular element in the wellbore such that a lower end portion of a wall of the tubular element extends radially outward and in an axially reverse direction so as to form an expanded tubular section extending around a remaining tubular section of the tubular element, whereby an annulus is defined between said expanded and remaining tubular sections;
   b) axially extending the expanded tubular section by moving the remaining tubular section downward relative to the expanded tubular section so that said lower end portion of the wall bends radially outward and in an axially reverse direction; and
   c) positioning load transfer means in the annulus, wherein positioning load transfer means in the annulus comprises inserting a stream of fluidic material susceptible to hardening into the annulus and allowing the fluidic material to harden in the annulus, the load transfer means being arranged to transfer a load between the remaining tubular section and the expanded tubular section.

2. The method of claim 1, wherein the fluidic material expands upon hardening.

3. The method of claim 1, wherein the load transfer means further comprises at least one annular support member connected to one of the remaining tubular section and the expanded tubular section.

4. The method of claim 1, wherein the load transfer means exerts a radially outward pressure to the expanded tubular section.

5. The method of claim 1, wherein a drill string is operated to further drill the wellbore, the drill string extending through the remaining tubular section.

6. The method of claim 5, wherein the drill string is operated simultaneously with lowering the remaining tubular section in the wellbore.

7. The method of claim 1, wherein the wall of the tubular element includes a material subject to plastic deformation during said bending of the wall so that the expanded tubular section retains an expanded shape as a result of said plastic deformation.

8. The method of claim 1, wherein the remaining tubular section is subjected to an axially compressive force inducing said downward movement of the remaining tubular section.

9. The method of claim 8, wherein said axially compressive force at least partly results from the weight of the remaining tubular section.

10. A method of radially expanding a tubular element in a wellbore formed in an earth formation, the method comprising:
    a) arranging the tubular element in the wellbore such that a lower end portion of a wall of the tubular element extends radially outward and in an axially reverse direction so as to form an expanded tubular section extending around a remaining tubular section of the tubular element, whereby an annulus is defined between said expanded and remaining tubular sections;
    b) axially extending the expanded tubular section by moving the remaining tubular section downward relative to the expanded tubular section so that said lower end portion of the wall bends radially outward and in an axially reverse direction; and
    c) positioning load transfer means in the annulus, wherein positioning load transfer means in the annulus comprises arranging a body of swellable material in the annulus, the swellable material being susceptible to swelling upon contact with a selected fluid, and inserting the selected fluid into the annulus so as to contact the swellable material, the load transfer means being arranged to transfer a load between the remaining tubular section and the expanded tubular section.

11. The method of claim 10, wherein the swellable material includes a swellable elastomer.

12. The method of claim 10, wherein the load transfer means further comprises at least one annular support member connected to one of the remaining tubular section and the expanded tubular section.

13. The method of claim 10, wherein the load transfer means exerts a radially outward pressure to the expanded tubular section.

14. The method of claim 10, wherein a drill string is operated to further drill the wellbore, the drill string extending through the remaining tubular section.

15. The method of claim 14, wherein the drill string is operated simultaneously with lowering the remaining tubular section in the wellbore.

16. The method of claim 10, wherein the wall of the tubular element includes a material subject to plastic deformation during said bending of the wall so that the expanded tubular section retains an expanded shape as a result of said plastic deformation.

17. The method of claim 10, wherein the remaining tubular section is subjected to an axially compressive force inducing said downward movement of the remaining tubular section.

18. The method of claim 17, wherein said axially compressive force at least partly results from the weight of the remaining tubular section.

* * * * *